(12) United States Patent
Gorokhov et al.

(10) Patent No.: US 11,664,948 B2
(45) Date of Patent: May 30, 2023

(54) TECHNIQUES FOR MANAGING SOUNDING REFERENCE SIGNAL RESOURCE SWITCHING

(71) Applicant: QUALCOMM Incorporated, San Diego, CA (US)

(72) Inventors: Alexei Yurievitch Gorokhov, San Diego, CA (US); Levent Aydin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/646,042

(22) Filed: Dec. 27, 2021

(65) Prior Publication Data
US 2022/0216966 A1 Jul. 7, 2022

Related U.S. Application Data

(60) Provisional application No. 63/199,534, filed on Jan. 6, 2021.

(51) Int. Cl.
*H04L 5/00* (2006.01)
*H04B 7/06* (2006.01)

(52) U.S. Cl.
CPC ......... *H04L 5/0051* (2013.01); *H04B 7/0602* (2013.01)

(58) Field of Classification Search
CPC ... H04L 5/0051; H04B 7/0602; H04B 7/0691; H04B 7/0404; H04B 7/0604; H04B 7/0628; H04B 7/0689
See application file for complete search history.

(56) References Cited

U.S. PATENT DOCUMENTS

| | | | | |
|---|---|---|---|---|
| 2019/0356445 A1* | 11/2019 | Manolakos | .......... | H04B 7/0805 |
| 2021/0044458 A1* | 2/2021 | Gao | ...................... | H04L 1/1642 |
| 2021/0352596 A1* | 11/2021 | Liu | .......................... | H04W 8/24 |
| 2021/0367724 A1* | 11/2021 | Zhang | .................. | H04B 7/0413 |

FOREIGN PATENT DOCUMENTS

WO WO-2020248158 A1 12/2020

OTHER PUBLICATIONS

International Search Report and Written Opinion—PCT/US2021/073128—ISA/EPO—dated Apr. 8, 2022.

\* cited by examiner

*Primary Examiner* — Hashim S Bhatti
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive a first sounding reference signal (SRS) configuration, wherein the first SRS configuration indicates a number of antenna ports on which an SRS is to be transmitted. The UE may determine that the number of antenna ports indicated by the first SRS configuration exceeds an antenna capability of the UE. The UE may transmit one or more SRSs using a second SRS configuration based at least in part on determining that the first SRS configuration exceeds the antenna capability of the UE. Numerous other aspects are described.

30 Claims, 11 Drawing Sheets

TECHNIQUES FOR MANAGING SOUNDING REFERENCE SIGNAL RESOURCE SWITCHING

CROSS-REFERENCE TO RELATED APPLICATION

This Patent Application claims priority to U.S. Provisional Patent Application No. 63/199,534, filed on Jan. 6, 2021, entitled "TECHNIQUES FOR MANAGING SOUNDING REFERENCE SIGNAL RESOURCE SWITCHING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for managing sounding reference signal (SRS) resource switching.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or single-carrier frequency division multiplexing (SC-FDM) (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a first sounding reference signal (SRS) configuration, wherein the first SRS configuration indicates a number of antenna ports on which an SRS is to be transmitted; determining that the number of antenna ports indicated by the first SRS configuration exceeds an antenna capability of the UE; and transmitting one or more SRSs using a second SRS configuration based at least in part on determining that the first SRS configuration exceeds the antenna capability of the UE.

In some aspects, a UE for wireless communication includes a memory; and one or more processors operatively coupled to the memory, the memory and the one or more processors configured to: receive a first SRS configuration, wherein the first SRS configuration indicates a number of antenna ports on which an SRS is to be transmitted; determine that the number of antenna ports indicated by the first SRS configuration exceeds an antenna capability of the UE; and transmit one or more SRSs using a second SRS configuration based at least in part on determining that the first SRS configuration exceeds the antenna capability of the UE.

In some aspects, a non-transitory computer-readable medium storing a set of instructions for wireless communication includes one or more instructions that, when executed by one or more processors of a UE, cause the UE to: receive a first SRS configuration, wherein the first SRS configuration indicates a number of antenna ports on which an SRS is to be transmitted; determine that the number of antenna ports indicated by the first SRS configuration exceeds an antenna capability of the UE; and transmit one or more SRSs using a second SRS configuration based at least in part on determining that the first SRS configuration exceeds the antenna capability of the UE.

In some aspects, an apparatus for wireless communication includes means for receiving a first SRS configuration, wherein the first SRS configuration indicates a number of antenna ports on which an SRS is to be transmitted; means for determining that the number of antenna ports indicated by the first SRS configuration exceeds an antenna capability of the apparatus; and means for transmitting one or more SRSs using a second SRS configuration based at least in part on determining that the first SRS configuration exceeds the antenna capability of the apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure disclosed herein is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
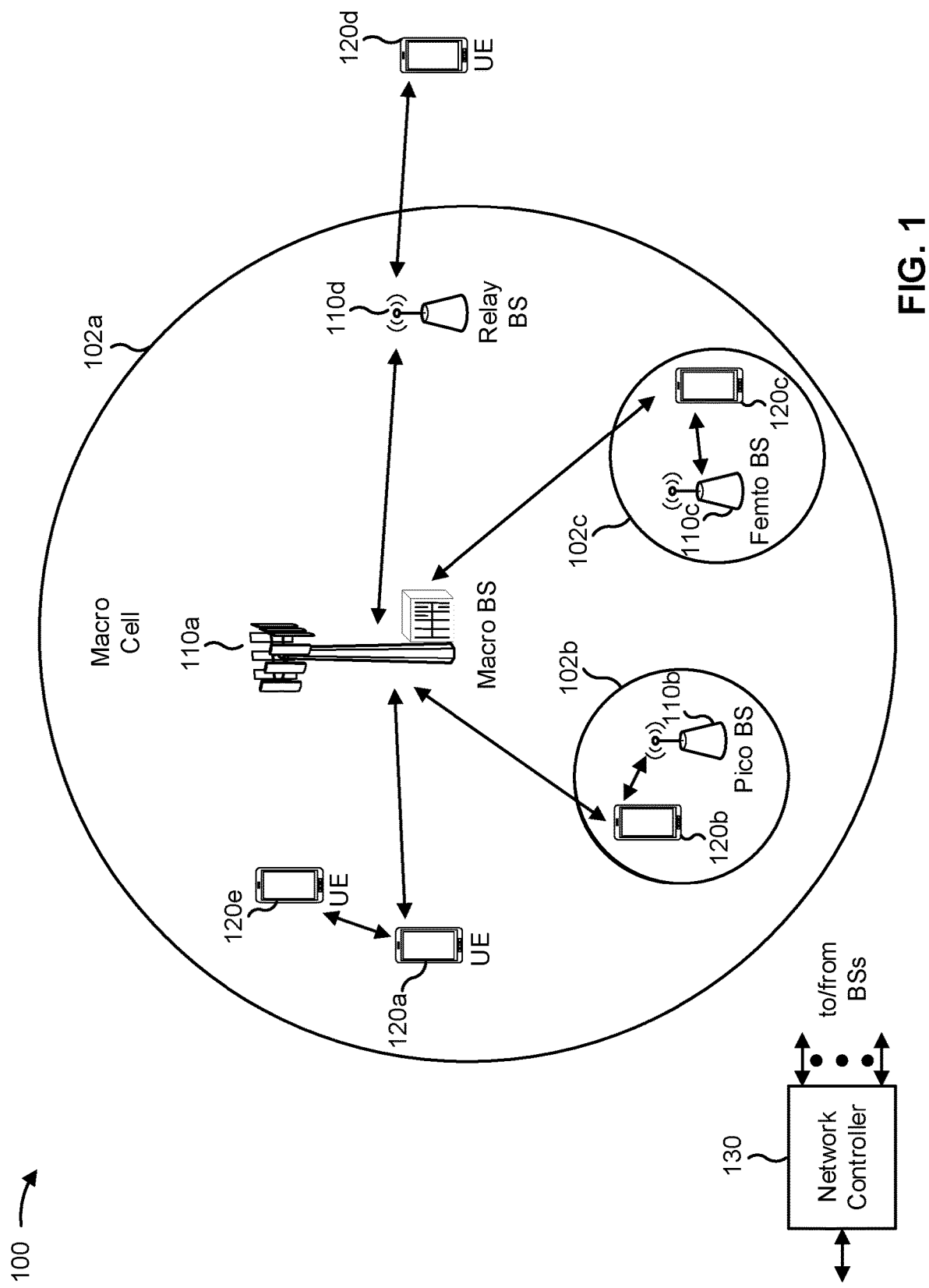
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
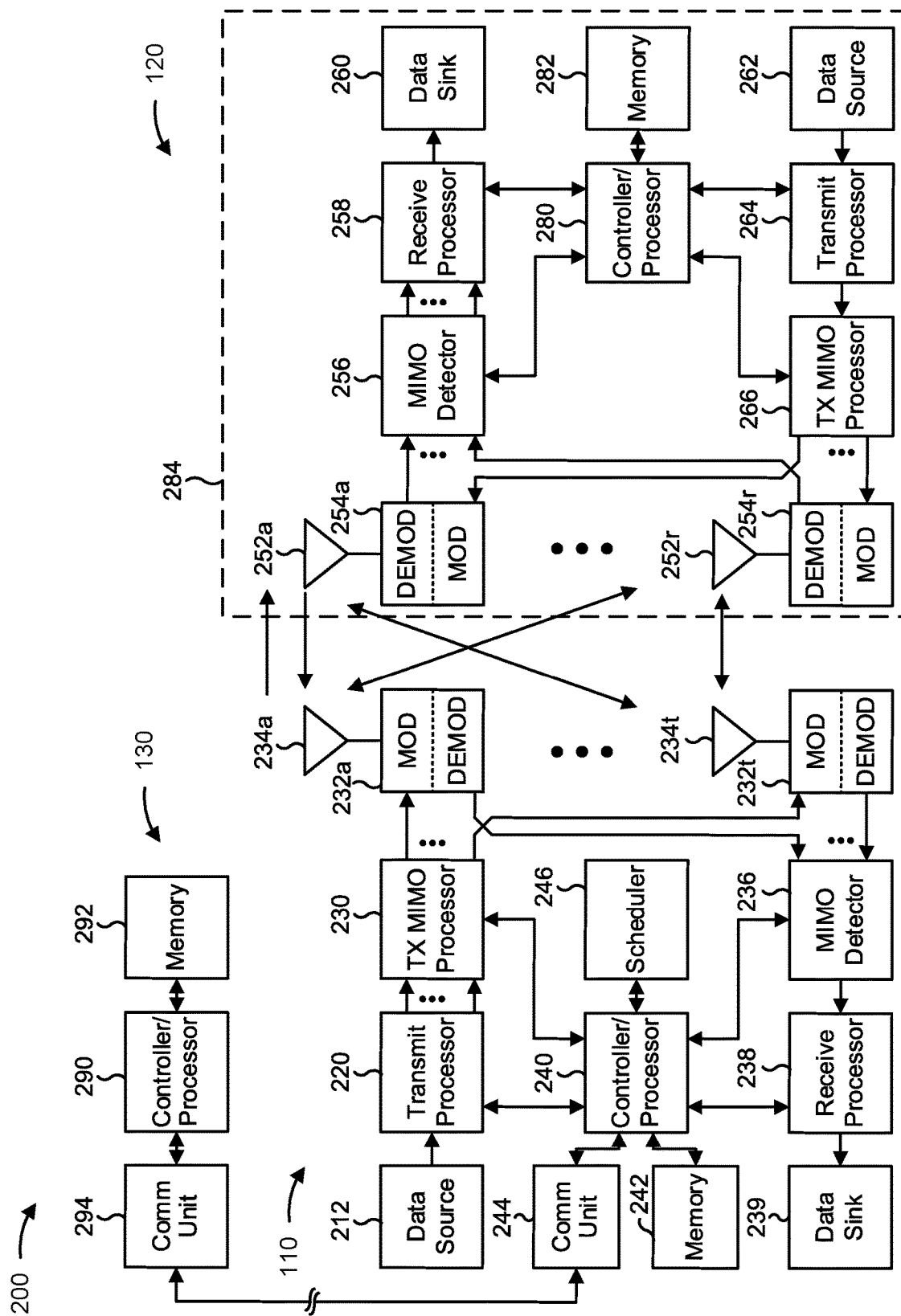
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs)

received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may process (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-ODFM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with managing sounding reference signal (SRS) resource switching, as described in more detail elsewhere herein. For example, controller/processor 240 of base station 110, controller/processor 280 of UE 120, and/or any other component(s) of FIG. 2 may perform or direct operations of, for example, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, and/or other processes as described herein. In some aspects, executing instructions may include running the instructions, converting the instructions, compiling the instructions, and/or interpreting the instructions.

In some aspects, the UE 120 includes means for receiving a first SRS configuration, wherein the first SRS configuration indicates a number of antenna ports on which an SRS is to be transmitted; means for determining that the number of antenna ports indicated by the first SRS configuration exceeds an antenna capability of the UE; and means for transmitting one or more SRSs using a second SRS configuration based at least in part on determining that the first SRS configuration exceeds the antenna capability of the UE. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Figure 3:
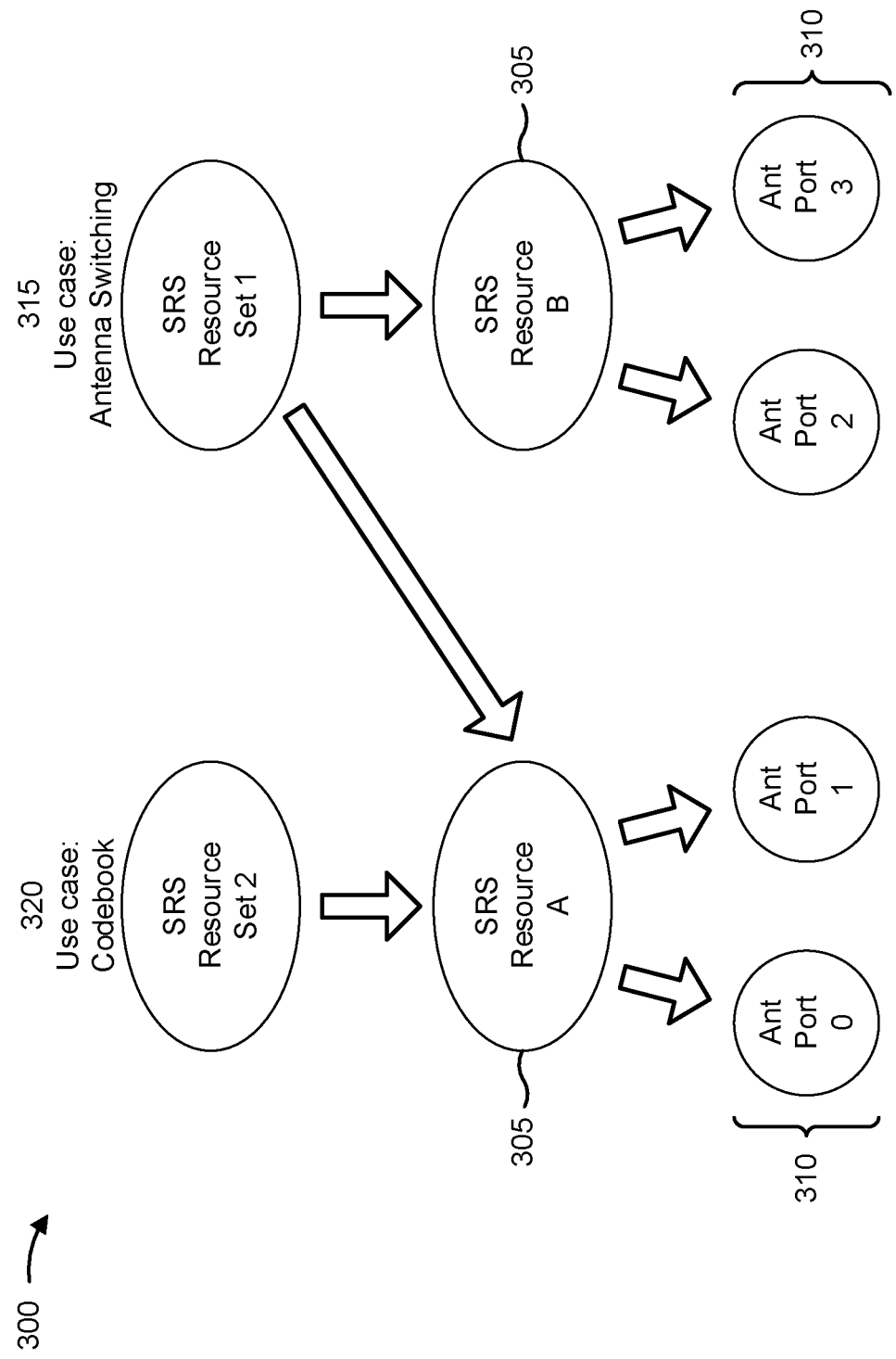
FIG. 3 is a diagram illustrating an example of sounding reference signal (SRS) resource sets, in accordance with the present disclosure.

FIG. 3 is a diagram illustrating an example 300 of SRS resource sets, in accordance with the present disclosure.

A base station 110 may configure a UE 120 with one or more SRS resource sets to allocate resources for SRS transmissions by the UE 120. For example, a configuration for SRS resource sets may be indicated in a radio resource control (RRC) message (e.g., an RRC configuration message or an RRC reconfiguration message). In some examples, a configuration for one or more SRS resource sets may be referred to herein as a first SRS configuration. As shown by reference number 305, an SRS resource set may include one or more resources (e.g., shown as SRS resources), which may include time resources and/or frequency resources (e.g., a slot, a symbol, a resource block, and/or a periodicity for the time resources).

As shown by reference number 310, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. It should be understood that a reference herein to transmitting an SRS via an antenna can refer to transmitting an SRS via a given antenna port or a combination of antenna ports, and that a reference herein to switching an antenna on which an SRS is to be transmitted can refer to switching an antenna port or a combination of antenna ports on which an SRS is to be transmitted. In some aspects, the configuration for an SRS resource set may indicate a use case/usage (e.g., in an SRS-SetUse information element) for the SRS resource set. For example, an SRS resource set may have a use case/usage of antenna switching, codebook, non-codebook, or beam management, defined below.

An antenna switching SRS resource set may be used to transmit an SRS used to determine downlink channel state information (CSI) with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to transmit an SRS used to determine uplink CSI when a base station 110 indicates an uplink precoder to the UE 120. For example, the base station 110 may use a codebook SRS (e.g., an SRS transmitted using a resource of a codebook SRS resource set) to acquire uplink CSI. The base station may use the uplink CSI to determine an uplink precoder to be indicated to the UE 120 and used by the UE 120 to communicate with the base station 110. In some aspects, virtual ports (e.g., a combination of two or more antenna ports) with a maximum transmit power may be supported at least for a codebook SRS.

A non-codebook SRS resource set may be used to transmit SRS used to determine uplink CSI when the UE 120 selects an uplink precoder. For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station 110).

A beam management SRS resource set may be used to determine CSI for millimeter wave communications.

An SRS resource can be configured as periodic, semi-persistent, or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated until de-configured, and may not be dynamically activated or deactivated. A semi-persistent SRS resource may be configured via a configuration message that indicates a periodicity and a slot offset for the semi-persistent SRS resource, and may be dynamically activated and deactivated (e.g., using downlink control information (DCI) or a medium access control (MAC) control element (CE) (MAC-CE)). An aperiodic SRS resource may be triggered dynamically, such as via DCI (e.g., UE-specific DCI or group common DCI) or a MAC-CE.

In some aspects, the UE 120 may be configured with a mapping between SRS ports (e.g., antenna ports on which an SRS is to be transmitted) and corresponding SRS resources. The UE 120 may transmit an SRS on a particular SRS resource using an SRS port indicated in the configuration. In some aspects, an SRS resource may span N adjacent symbols within a slot (e.g., where N equals 1, 2, or 4). The UE 120 may be configured with X SRS ports (e.g., where X≤4). In some aspects, each of the X SRS ports may mapped to a corresponding symbol of the SRS resource and used for transmission of an SRS in that symbol.

As shown in FIG. 3, in some aspects, different SRS resource sets indicated to the UE 120 (e.g., having different use cases/usages) may overlap (e.g., in time and/or in frequency, such as in the same slot). For example, as shown by reference number 315, a first SRS resource set (e.g., shown as SRS Resource Set 1) is shown as having an antenna switching use case/usage. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 320, a second SRS resource set (e.g., shown as SRS Resource Set 2) may have a codebook use case/usage. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

As indicated above, FIG. 3 is provided as an example. Other examples may differ from what is described with regard to FIG. 3.

A base station may configure a UE to transmit SRSs, such as to sound a radio channel, in which the base station and the UE are operating. There may be multiple modes of operation for an SRS, depending on the number of channels to be sounded. The modes may be based at least in part on the number of transmit antennas and receive antennas (e.g., the number of transmit antenna ports and receive antenna ports) associated with the UE that is to transmit the SRSs. For example, the modes may include 1T1R (e.g., a UE using 1 transmit antenna and 1 receive antenna), 1T2R (e.g., a UE using 1 transmit antenna and 2 receive antennas), 1T4R (e.g., a UE using 1 transmit antenna and 4 receive antennas), 2T4R (e.g., a UE using 2 transmit antennas and 4 receive antennas), and so on. Generally, a UE may transmit SRSs using one or more transmit antennas and/or one or more receive antennas so that the base station can determine downlink channel conditions (on the assumption that the UE-to-BS channel is reciprocal with the BS-to-UE channel) or to convey certain information, described in more detail elsewhere herein. For example, a UE with a 1T4R configuration may be expected to transmit SRSs via 4 antennas, since the SRS is used to sound the downlink channel and the UE is associated with 4 receive antennas (which may be used to receive downlink communications).

In some situations, a UE may be configured with an SRS configuration (e.g., an SRS resource set indicating a set of antenna ports for transmission of SRSs at particular time/frequency resources) that the UE is incapable of handling. For example, a UE may have a hardware limitation such as a 1T2R configuration but may advertise a capability for 1T4R SRS switching in order to be permitted to access a network. Such a UE may be configured with an SRS configuration that exceeds the UE's hardware limitation, such as an SRS configuration that requires sounding from 4 antennas. As another example, a UE may have a shared hardware limitation. For example, one or more antennas of the UE may be shared between a first RAT (e.g., LTE) and a second RAT (e.g., NR). In this situation, the transmission of the SRS on the second RAT may negatively impact operation of the first RAT on a shared antenna, so the UE may suppress transmission of the SRS in order to prioritize performance of the first RAT.

The configuration of the UE with an SRS configuration that exceeds the UE's capabilities (e.g., with respect to the number of antenna ports available for contemporaneous SRS transmission), whether due to a hardware limitation of the UE, a shared antenna configuration of the UE, or another factor, may cause SRS transmission to fail, thereby degrading the quality of sounding information determined by the base station. If the base station's sounding information quality is degraded, then utilization of UE resources and BS resources may be suboptimal, thereby leading to decreased reliability and throughput.

Some techniques and apparatuses described herein provide management of SRS resource switching. For example, a UE may receive a first SRS configuration indicating a number of antenna ports on which an SRS (e.g., one or more SRSs) is to be transmitted. The UE may determine that the number of antenna ports indicated by the first SRS configuration exceeds an antenna capability of the UE. The UE may switch to a second SRS configuration based at least in part on determining that the first SRS configuration exceeds the antenna capability of the UE. The second SRS configuration may involve blanking of one or more SRS transmissions, transmitting one or more SRSs on a transmit antenna of the UE (where no blanking associated with a different RAT is performed), transmitting one or more SRSs on alternating antennas, or the like. In this way, the impact on SRS transmission of a first SRS configuration that exceeds the UE's antenna capability is reduced, thereby improving quality of sounding information determined using SRS, which improves reliability and throughput of the network.

Figure 4:
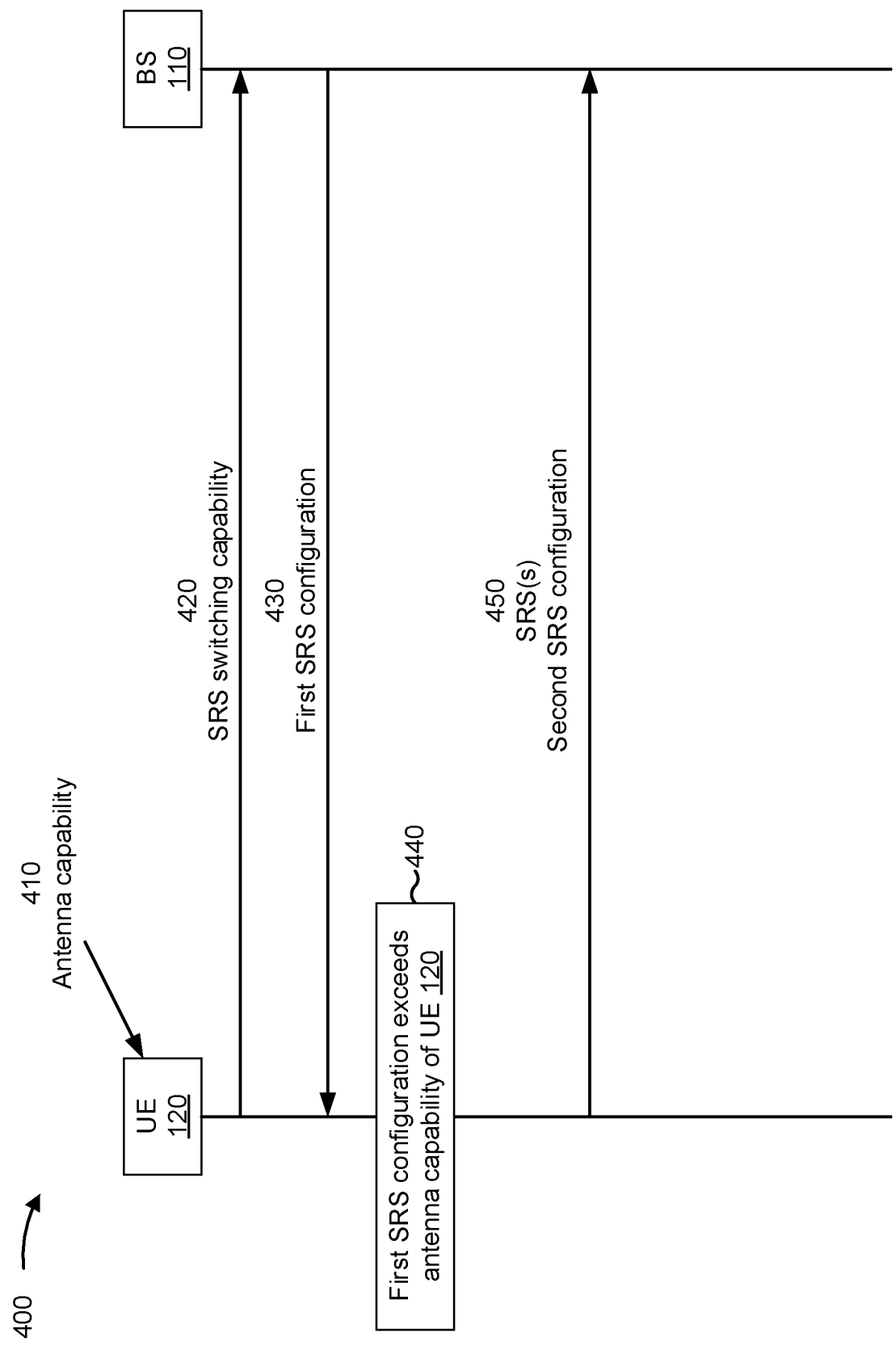
FIG. 4 is a diagram illustrating an example of managing SRS resource switching, in accordance with the present disclosure.

FIG. 4 is a diagram illustrating an example 400 of managing SRS resource switching, in accordance with the present disclosure. As shown, example 400 includes a UE 120 and a BS 110. As shown by reference number 410, the UE 120 may be associated with an antenna capability. The antenna capability may indicate a number of antenna ports (e.g., a number of receive antenna ports, a number of transmit antenna ports, a number of transmit antenna ports and receive antenna ports, or the like) that can be contemporaneously used by the UE 120. For example, the antenna capability may indicate a number of antenna ports on which the UE 120 can contemporaneously transmit an SRS. The antenna capability may be based at least in part on a hardware configuration of the UE 120 (e.g., a number of transmit antennas and receive antennas of the UE, a switching configuration that indicates which antennas of the UE 120 can simultaneously transmit and/or receive data, or the like), a shared hardware configuration of the UE 120 (e.g., in which one or more antennas may be shared between a first RAT and a second RAT, such as in connection with a non-standalone mode), or the like. Examples of antenna capabilities include 1T1R, 1T2R, 1T4R, 2T4R, and so on. In some aspects, the antenna capability may indicate a number of antenna ports (e.g., antennas) that can actually be used (simultaneously) by the UE 120, which may differ from a reported antenna capability of the UE 120 for SRS switching, as described below.

As shown by reference number 420, the UE 120 may transmit information indicating an SRS switching capability. The SRS switching capability may indicate a number of antennas on which the UE 120 can transmit an SRS. The SRS switching capability can be expressed as 1T1R, 1T2R, 1T4R, 2T4R, and so on. For example, the SRS switching capability can be expressed as an antenna capability (which may differ from the antenna capability of the UE, as described below). In some aspects, an SRS switching capability may be associated with a mode, such as a non-standalone (NSA) mode or a standalone (SA) mode. An NSA mode may be a mode in which the UE 120 operates using two or more RATs (e.g., LTE and NR) whereas an SA mode may be a mode in which the UE 120 operates using a single RAT. The NSA mode and the SA mode may be associated with different antenna capabilities due to antenna sharing between RATs in the NSA mode which may not occur in the SA mode. For example, in one aspect, the antenna capability shown by reference number 410 may be for an SA mode (e.g., 1T2R) and the information indicating the SRS switching capability may indicate an antenna capability for the NSA mode (e.g., 1T4R).

In some aspects, the SRS switching capability may indicate an antenna capability that differs from the antenna capability shown by reference number 410. For example, in some cases, the UE 120 may advertise an SRS switching capability that is greater than (e.g., indicates a larger number of available antennas than) an antenna capability that the UE 120 is capable of achieving in a given scenario. In some aspects, the UE 120 may advertise an SRS switching capability to access a network provided by BS 110. For example, the BS 110 may permit only UEs that advertise a threshold SRS switching capability to access the network, so the UE 120 may advertise the threshold SRS switching capability in order to be permitted to access the network. As another example, the UE 120 may advertise an SRS switching capability related to a first mode (e.g., an NSA mode, with an SRS switching capability of XT4R, where X is an integer) and may have an antenna capability of XT2R in a second mode (e.g., an SA mode). The advertisement of the SRS switching capability that differs from the antenna capability shown by reference number 410 may lead to a situation where the BS 110 configures the UE 120 with an SRS configuration that exceeds the antenna capability shown by reference number 410, as described in more detail below.

As shown by reference number 430, the BS 110 may transmit a first SRS configuration to the UE 120. For example, the first SRS configuration may be based at least in part on the SRS switching capability transmitted by the UE 120. The first SRS configuration may indicate one or more SRS resource sets and a set of antenna ports on which a set of SRSs are to be transmitted. In some aspects, the BS 110 may transmit the first SRS configuration to the UE 120 via control signaling, such as an RRC message or the like.

As shown by reference number 440, the UE 120 may determine that the first SRS configuration exceeds the antenna capability of the UE 120. For example, the UE 120 may determine that a number of antenna ports indicated by the first SRS configuration (e.g., a number of antenna ports on which the UE 120 is to transmit one or more SRSs indicated by the first SRS configuration) exceeds the number of antenna ports on which the UE 120 can contemporaneously transmit. In some aspects, the UE 120 may determine that the first SRS configuration exceeds the antenna capability of the UE 120 based at least in part on a number of transmit antenna ports indicated by the first SRS configuration, a number of receive antenna ports indicated by the first SRS configuration, or a combination thereof.

In some aspects, the UE 120 may determine that the first SRS configuration exceeds the antenna capability of the UE 120 based at least in part on an antenna blanking configuration, such as an antenna blanking configuration associated with multiple RAT operation (e.g., multi-RAT dual connectivity (DC), E-UTRA-NR DC (EN-DC), NSA mode) operation of the UE 120. For example, in multiple RAT operation, an antenna blanking configuration may be utilized to ensure that an antenna of the UE 120 (e.g., a transmit antenna or a receive antenna, a transmit antenna port or a receive antenna port) is available for communication on a first RAT. The antenna blanking configuration may involve blanking (e.g., dropping, suppressing) communications associated with the antenna on a second RAT. Antenna blanking may cause the number of antenna ports supported by an antenna capability of a UE 120 (e.g., the antenna capability shown by reference number 410) to be lesser than the number of antenna ports advertised by the UE 120 in the first SRS configuration. Thus, the UE 120 may determine that the first SRS configuration exceeds the antenna capability of the UE 120 based at least in part on the antenna blanking configuration associated with the multi-RAT operation, as described in more detail below.

In some aspects, the UE 120 may determine if the first SRS configuration exceeds the antenna capability of the UE 120 based at least in part on a threshold, such as a threshold associated with the quality of communication. For example, the threshold may be a threshold block error rate (BLER) or a threshold throughput. In some aspects, the UE 120 can determine that the first SRS configuration exceeds the antenna capability of the UE 120 based at least in part on a determination that the threshold associated with the quality of communication being satisfied or not being satisfied. For example, the UE 120 may determine that a communication is associated with a threshold BLER and may therefore determine a second SRS configuration for the transmission of the one or more SRSs, as described in more detail below. As another example, the UE 120 may determine that a communication is associated with a throughput that fails to satisfy a threshold (e.g., a throughput that is lower than the threshold) and may therefore determine a second SRS configuration for the transmission of the one or more SRS, as described in more detail below.

As shown by reference number 450, the UE 120 may transmit one or more SRSs using a second SRS configuration based at least in part on determining that the first SRS configuration exceeds the antenna capability of the UE 120. For example, the UE 120 may determine the second SRS configuration based at least in part on the first SRS configuration exceeding the antenna capability of the UE 120. In some aspects, the UE 120 may determine the second SRS configuration based at least in part on the antenna capability 410 of the UE 120. For example, the UE 120 may determine the second SRS configuration such that an impact of the difference between the first SRS configuration and the antenna capability is reduced or minimized, such that a number of dropped SRS transmissions of the first SRS configuration is reduced or minimized, or the like. The second SRS configuration may indicate a set of antennas/antenna ports and/or resources for SRS transmission associated with the set of antennas/antenna ports (such as time resources and/or frequency resources). In some aspects, the second SRS configuration may be a modification of the first SRS configuration. In some aspects, the second SRS configuration may be a different SRS configuration (e.g., associated with a different SRS resource set) than the first SRS configuration. Examples of the second SRS configuration are provided below.

In some aspects, the second SRS configuration may use a main transmit antenna of the UE 120. For example, the first SRS configuration may indicate a number of receive antennas of the UE 120 that exceeds an antenna capability of the UE 120 (e.g., that exceeds a number of receive antennas available for transmission in accordance with the antenna capability 410). In some aspects, the UE 120 may determine to use the main transmit antenna of the UE 120 (e.g., an antenna port corresponding to the main transmit antenna) to transmit one or more SRSs based at least in part on determining that the number of receive antennas indicated by the first SRS configuration exceeds the antenna capability of the UE 120. Thus, the UE 120 may improve sounding of the channel with minimal impact on sounding accuracy. As used herein, a main transmit antenna may be a transmit antenna used for uplink communication via a primary cell of the UE 120, such as via an anchor RAT of a dual RAT (e.g., NSA) mode of the UE 120. In some aspects, the transmission of the one or more SRSs using the second SRS configuration may use the main transmit antenna of the UE based at least in part on a determination that a communication associated with a first RAT is not impacted by the usage of the main transmit antenna, wherein the transmission of the one or more SRSs is associated with a second RAT. The determination that the communication associated with the first RAT is not impacted may be based at least in part on an amount of time associated with transmission of the one or more SRSs, particular communications impacted by the transmission of the one or more SRSs, a RAT associated with the communication, or the like. For example, the first RAT may be LTE and the second RAT may be NR.

In some aspects, the second SRS configuration may cause the transmission of the one or more SRSs to alternate between two or more antenna ports. For example, the second SRS configuration may cause the transmission of the one or more SRSs to alternate between two or more antennas of the UE 120, such as two or more receive antennas of the UE 120. By transmitting the one or more SRSs in an alternating fashion between two or more antennas (e.g., antenna ports), the UE 120 may reduce impact of SRS transmission on any single antenna, thereby reducing the likelihood of blanking of an SRS transmission in the entirety and improving accuracy of sounding of the channel.

In some aspects, the UE 120 may blank transmission of an SRS based at least in part on the second SRS configuration. For example, the UE 120 may drop or cancel transmission of one or more SRSs based at least in part on determining that the first SRS configuration exceeds the antenna capability of the UE 120.

As indicated above, FIG. 4 is provided as an example. Other examples may differ from what is described with regard to FIG. 4.

Figure 5:
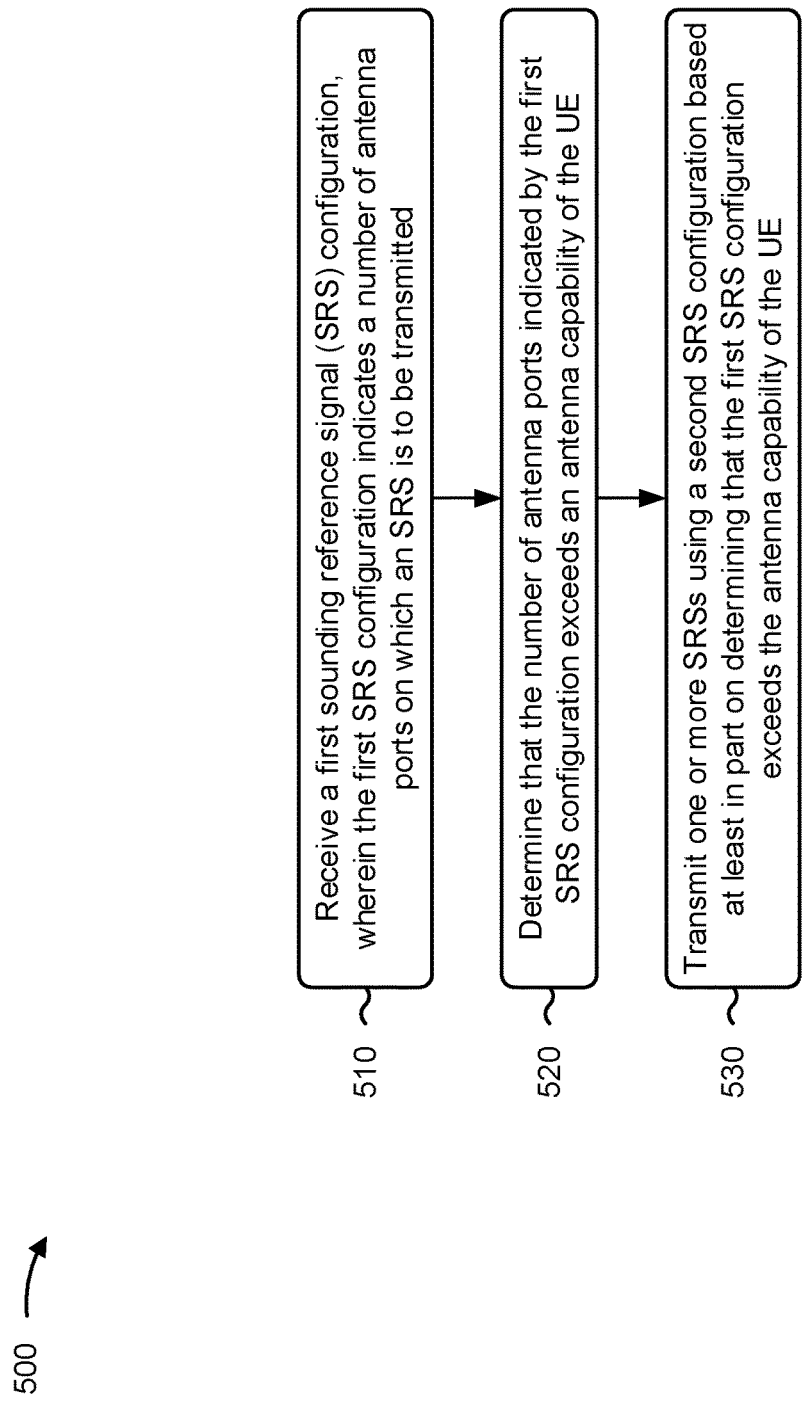
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., UE 120) performs operations associated with techniques for managing SRS resource switching.

As shown in FIG. 5, in some aspects, process 500 may include receiving a first SRS configuration, wherein the first SRS configuration indicates a number of antenna ports on which an SRS is to be transmitted (block 510). For example, the UE (e.g., using reception component 602, depicted in FIG. 6) may receive a first SRS configuration, wherein the first SRS configuration indicates a number of antenna ports (e.g., antennas) on which an SRS is to be transmitted, as described above.

As further shown in FIG. 5, in some aspects, process 500 may include determining that the number of antenna ports indicated by the first SRS configuration exceeds an antenna capability of the UE (block 520). For example, the UE (e.g., using determination component 608, depicted in FIG. 6) may determine that the number of antenna ports indicated by the first SRS configuration exceeds an antenna capability of the UE, as described above.

As further shown in FIG. 5, in some aspects, process 500 may include transmitting one or more SRSs using a second SRS configuration based at least in part on determining that the first SRS configuration exceeds the antenna capability of the UE (block 530). For example, the UE (e.g., using transmission component 604, depicted in FIG. 6) may transmit one or more SRSs using a second SRS configuration based at least in part on determining that the first SRS configuration exceeds the antenna capability of the UE, as described above. The second SRS configuration may involve fewer antenna ports than indicated by the first SRS configuration. In some examples, the second SRS configuration may involve a number of antenna ports corresponding to the antenna capability of the UE or within the antenna capability of the UE.

Process 500 may include additional aspects, such as any single aspect or any combination of aspects described below and/or in connection with one or more other processes described elsewhere herein.

In a first aspect, the transmission of the one or more SRSs using the second SRS configuration uses fewer antenna ports than the number of antenna ports.

In a second aspect, alone or in combination with the first aspect, the number of antenna ports is a number of receive antenna ports, and the transmission of the one or more SRSs using the second SRS configuration may use a main transmit antenna of the UE.

In a third aspect, alone or in combination with the second aspect, the transmission of the one or more SRSs using the second SRS configuration uses the main transmit antenna of the UE based at least in part on a determination (e.g., using determination component 608 depicted in FIG. 6) that a communication associated with a first radio access technology is not impacted by the usage of the main transmit antenna, wherein the transmission of the one or more SRSs is associated with a second radio access technology.

In a fourth aspect, alone or in combination with one or more of the first through third aspects, the transmission of the one or more SRSs using the second SRS configuration alternates between two or more antenna ports of the UE.

In a fifth aspect, alone or in combination with one or more of the first through fourth aspects, the antenna capability is a first antenna capability that indicates a number of antenna ports that can be contemporaneously used by the UE, and wherein the first SRS configuration is based at least in part on a second antenna capability reported by the UE.

In a sixth aspect, alone or in combination with the fifth aspect, the second antenna capability is for a non-standalone mode and the first antenna capability is for a standalone mode.

In a seventh aspect, alone or in combination with one or more of the first through sixth aspects, the determination that the first SRS configuration exceeds the antenna capability of the UE is based at least in part on an antenna blanking configuration associated with multiple radio access technology operation of the UE.

In an eighth aspect, alone or in combination with one or more of the first through seventh aspects, the determination that the first SRS configuration exceeds the antenna capability of the UE is based at least in part on a threshold associated with a quality of a communication of the UE.

In a ninth aspect, alone or in combination with one or more of the first through eighth aspects, the threshold associated with the quality of the communication of the UE includes a threshold block error rate or a threshold throughput.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
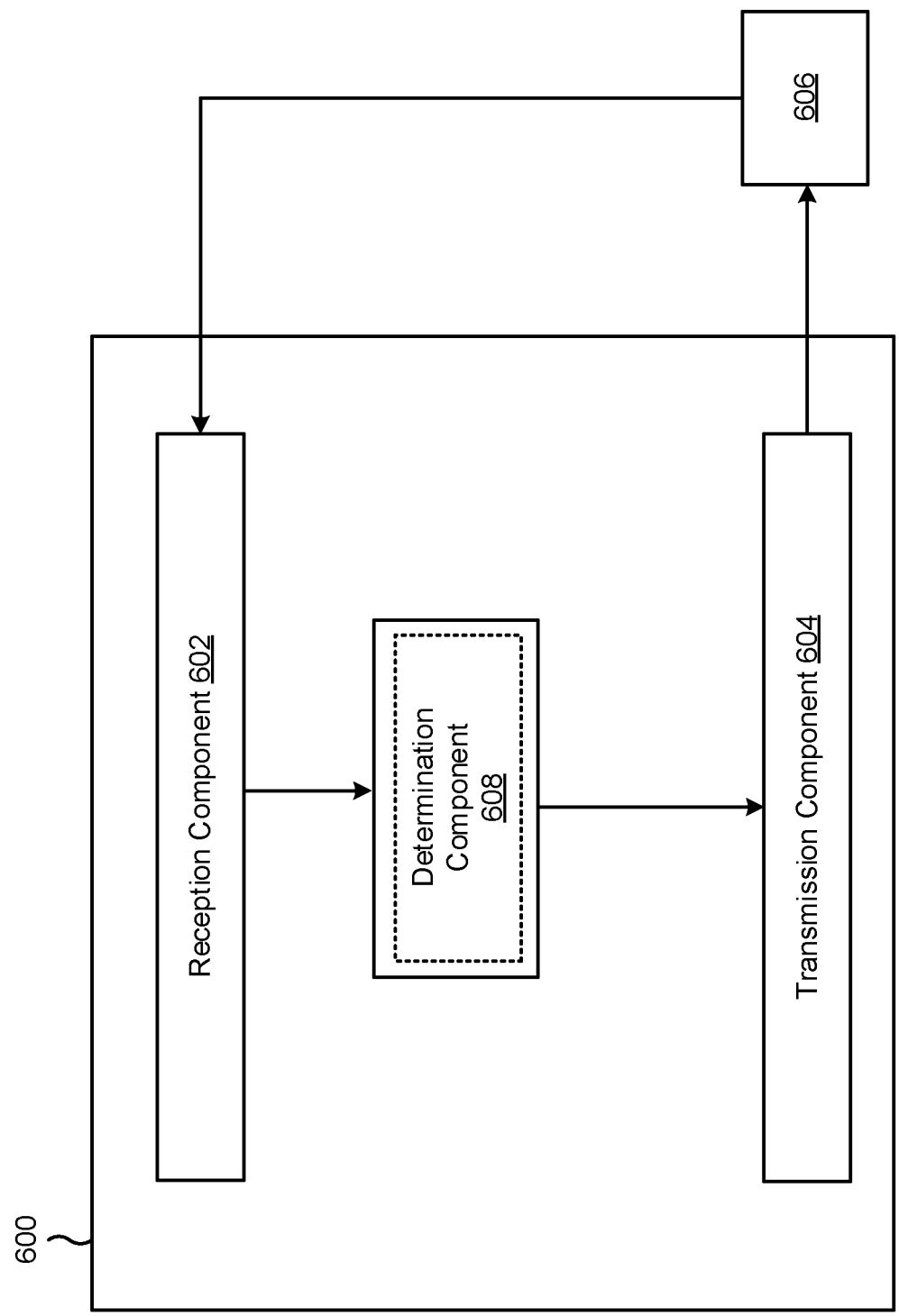
FIG. 6 is a block diagram of an example apparatus for wireless communication, in accordance with the present disclosure.

FIG. 6 is a block diagram of an example apparatus 600 for wireless communication, in accordance with the present disclosure. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include a determination component 608, among other examples.

In some aspects, the apparatus 600 may be configured to perform one or more operations described herein in connection with FIGS. 3-4. Additionally, or alternatively, the apparatus 600 may be configured to perform one or more processes described herein, such as process 500 of FIG. 5, or a combination thereof. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive a first SRS configuration, wherein the first SRS configuration indicates a number of antenna ports on which an SRS is to be transmitted. The determination component 608 may determine that the number of antenna ports indicated by the first SRS configuration exceeds an antenna capability of the UE. The transmission component 604 may transmit one or more SRSs using a second SRS configuration based at least in part on determining that the first SRS configuration exceeds the antenna capability of the UE.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
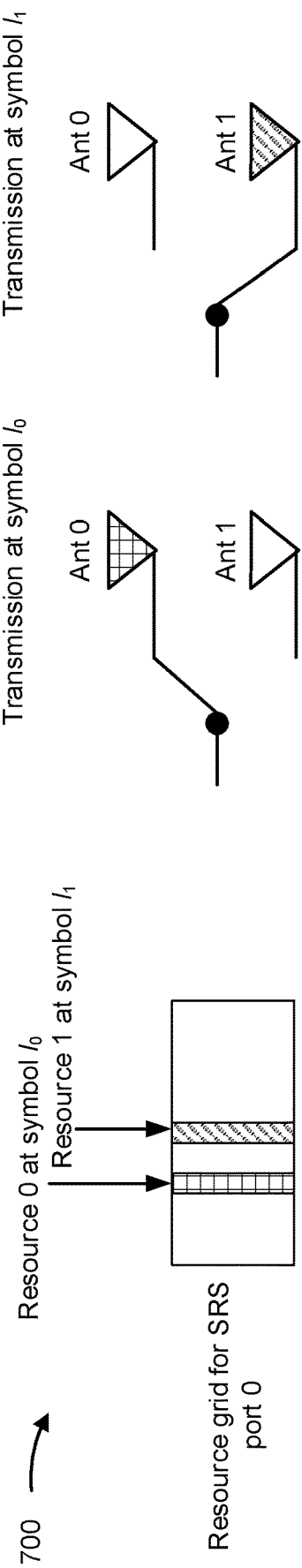
FIGS. 7 and 8 are diagrams illustrating examples of SRS transmission in accordance with an SRS configuration, in accordance with the present disclosure.
Figure 8:
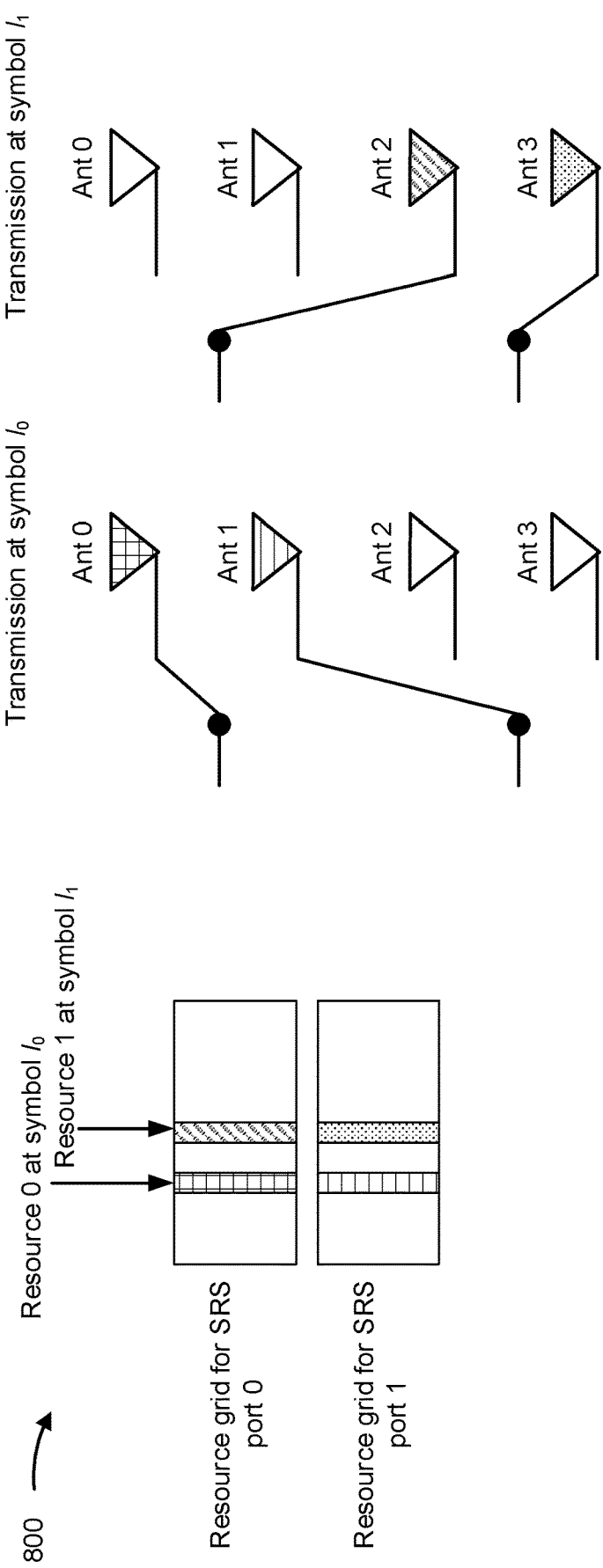

FIGS. 7 and 8 are diagrams illustrating examples 700 and 800 of SRS transmission in accordance with an SRS configuration, in accordance with the present disclosure. The SRS configuration of examples 700 and 800 may be a second SRS configuration. Examples 700 and 800 include resource grids, which may each span a slot. A given resource grid corresponds to an SRS port. As shown in example 700, a resource grid or SRS resource set for a two-antenna SRS configuration (e.g., for SRS transmission via two antenna ports) may include a first SRS resource (e.g., resource 0 at symbol $l_0$) and a second SRS resource (e.g., resource 1 at symbol $l_1$). Resource 0 is shown using a square fill and Resource 1 is shown using a diagonal fill. Example 700 also shows transmissions via a first antenna (shown as Ant 0 and corresponding to a first antenna port or group of antenna ports) and a second antenna (shown as Ant 1 and corresponding to a second antenna port or group of antenna ports). As shown, in a symbol $l_0$, a UE may transmit an SRS via antenna 0. In a symbol $l_1$, the UE may transmit an SRS via antenna 1. Thus, the UE may be configured to transmit SRSs in accordance with the SRS configuration.

If example 700 includes four antennas (e.g., antennas 0, 1, 2, and 3) and a single SRS port, then the SRS configuration may map SRS resources to symbols $l_0$, $l_1$, $l_2$, and $l_3$, which may occur in the same slot or different slots. The UE may transmit a respective SRS resource in each of symbols $l_0$, $l_1$, $l_2$, and $l_3$ via a respective antenna, of antennas 0, 1, 2, and 3.

Example 800 includes two SRS ports, and relates to a UE associated with four antennas (e.g., 2T4R). For example, a resource grid (e.g., of an SRS resource set) for a first SRS port (SRS port 0) and a resource grid (e.g., of an SRS resource set) for a second SRS port (SRS port 1) are shown. In example 800, the symbol $l_0$ and the symbol $l_1$ each include two SRS transmissions: a first SRS resource to be transmitted via SRS ports 0 and 1, and a second SRS resource to be transmitted via SRS ports 0 and 1. In the present disclosure, "transmitting an SRS resource" can refer to transmitting an SRS in the SRS resource. Thus, as shown, the UE may transmit the first SRS resource via antenna 0 and via antenna 1 in symbol $l_0$, and may transmit the second SRS resource via antenna 2 and via antenna 3 in symbol $l_1$.

Figure 9:
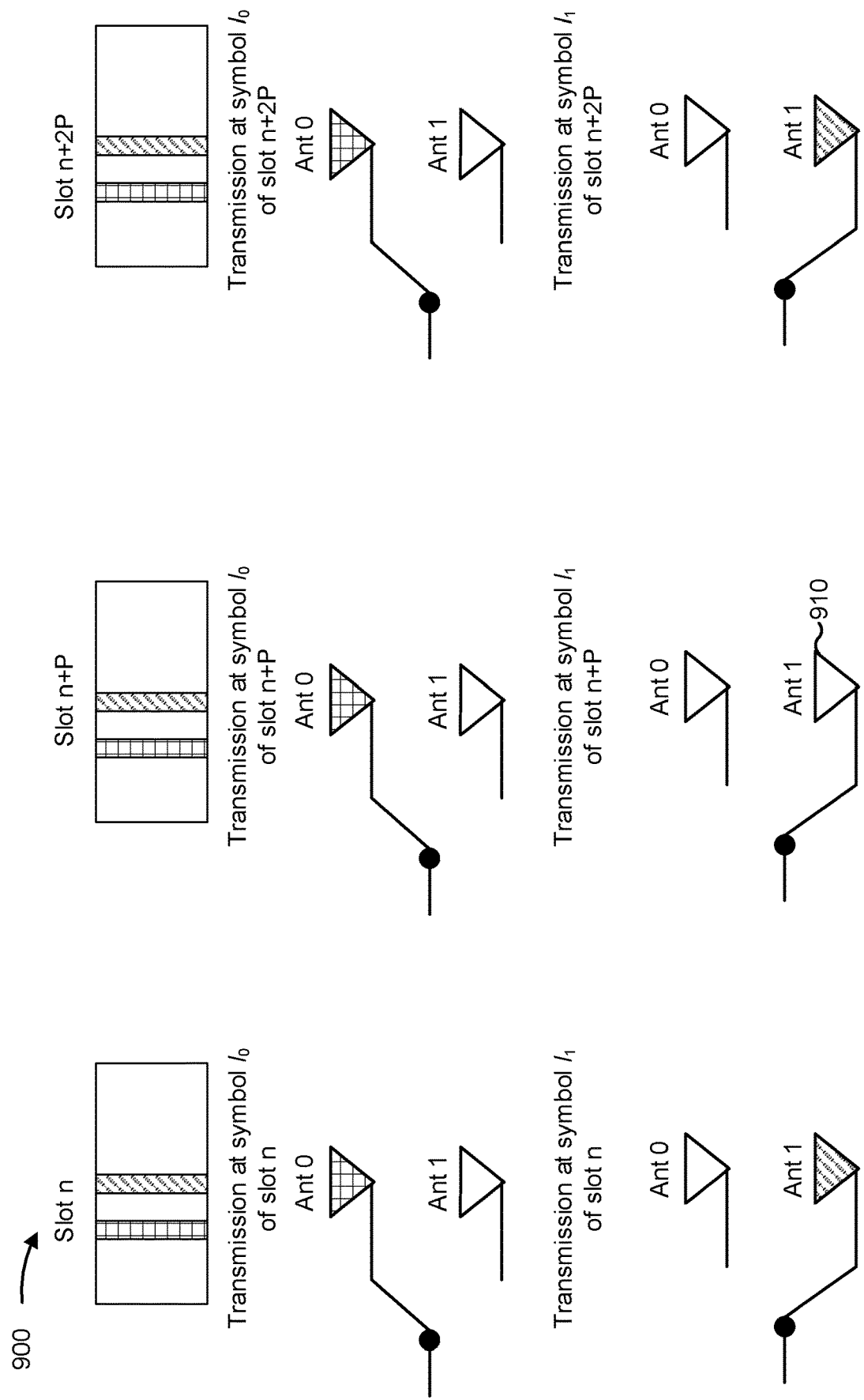
FIG. 9 is a diagram illustrating an example of blanking of an SRS transmission based at least in part on an antenna capability of a UE, in accordance with the present disclosure.

FIG. 9 is a diagram illustrating an example 900 of blanking of an SRS transmission based at least in part on an antenna capability of a UE, in accordance with the present disclosure. FIG. 9 shows resource grids (e.g., of an SRS resource set) for an SRS configuration (e.g., a first SRS configuration) at slots n, n+P, and n+2P, where n and P are integers. Below the resource grid for a given slot, transmissions at symbol $l_0$ of the given slot and symbol $l_1$ of the given slot are shown. As shown by reference number 910, the UE may not transmit an SRS on antenna 1 at symbol $l_1$ of slot n+P. In other words, the transmission of the SRS on antenna 1 at symbol $l_1$ of slot n+P may be blanked. For example, the UE may not transmit the SRS based at least in part on a determination that the SRS configuration exceeds an antenna capability of the UE. In some aspects, the UE may not transmit the SRS based at least in part on an antenna blanking configuration. The antenna blanking configuration may indicate one or more antenna ports on which a transmission of an SRS resource shall be dropped/blanked. In some aspects, the UE may not transmit the SRS shown by reference number 910 based at least in part on a second SRS configuration. Thus, the UE may reduce utilization of antenna 1 for SRS transmission, thereby improving coexistence between SRS signaling and other communications, such as intra-RAT or inter-RAT communications.

Figure 10:
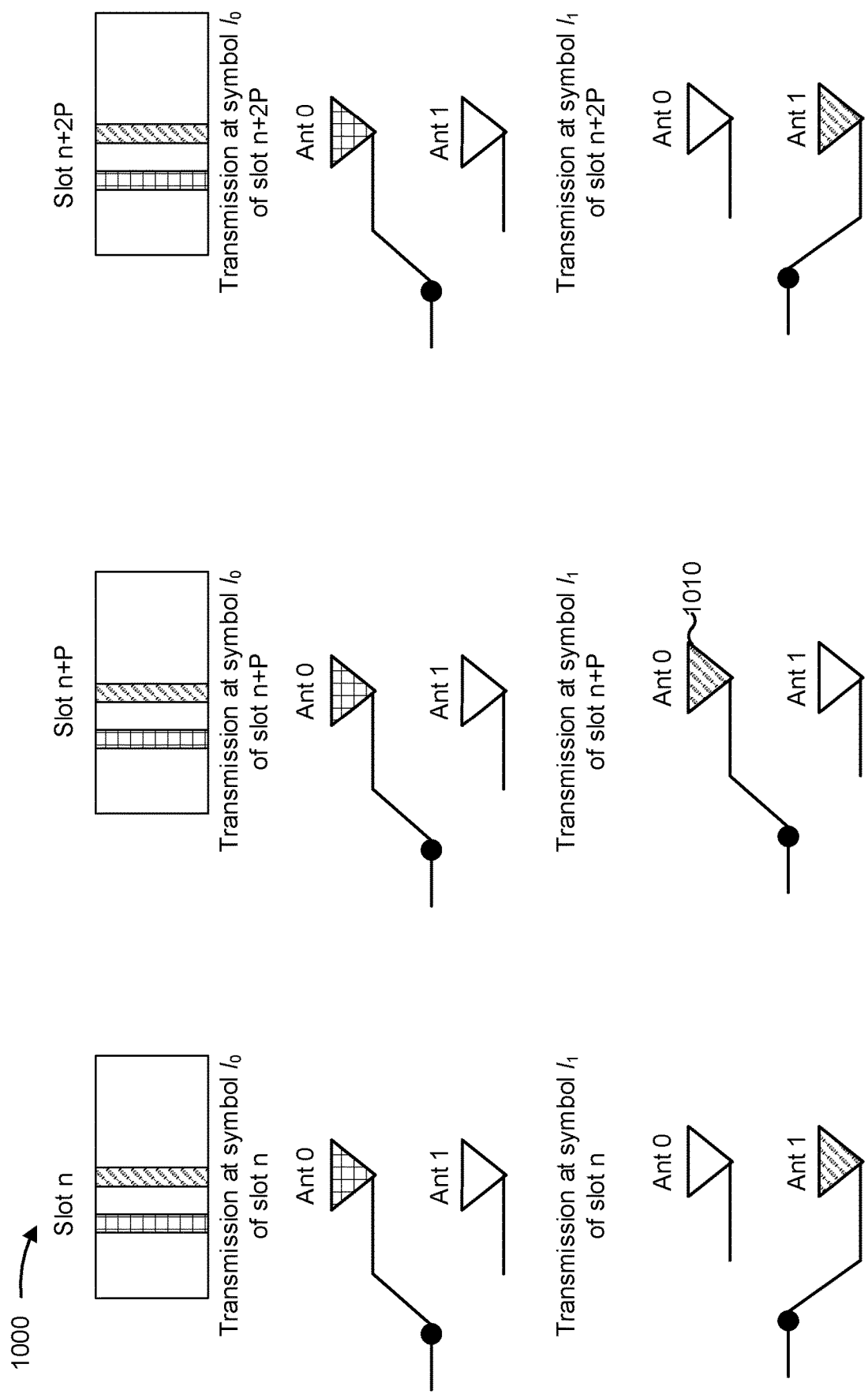
FIG. 10 is a diagram illustrating an example of transmission of an SRS on alternating antennas, in accordance with the present disclosure.

FIG. 10 is a diagram illustrating an example 1000 of transmission of an SRS on alternating antennas, in accordance with the present disclosure. Example 1000 includes a similar set of resource grids (e.g., of an SRS resource set) as example 900, which may be defined, for example, by a first SRS configuration. In example 1000, as shown by reference number 1010, the UE may transmit an SRS on antenna 0 at both symbol $l_0$ and $l_1$. For example, the UE may transmit the SRS in both symbols on antenna 0 based at least in part on a determination that the SRS configuration exceeds an antenna capability of the UE, such as in accordance with a second SRS configuration. Thus, the UE may reduce impact of the SRS transmission on antenna 1 while continuing to transmit the SRS, which improves SRS accuracy and therefore throughput and network resource utilization.

Figure 11:
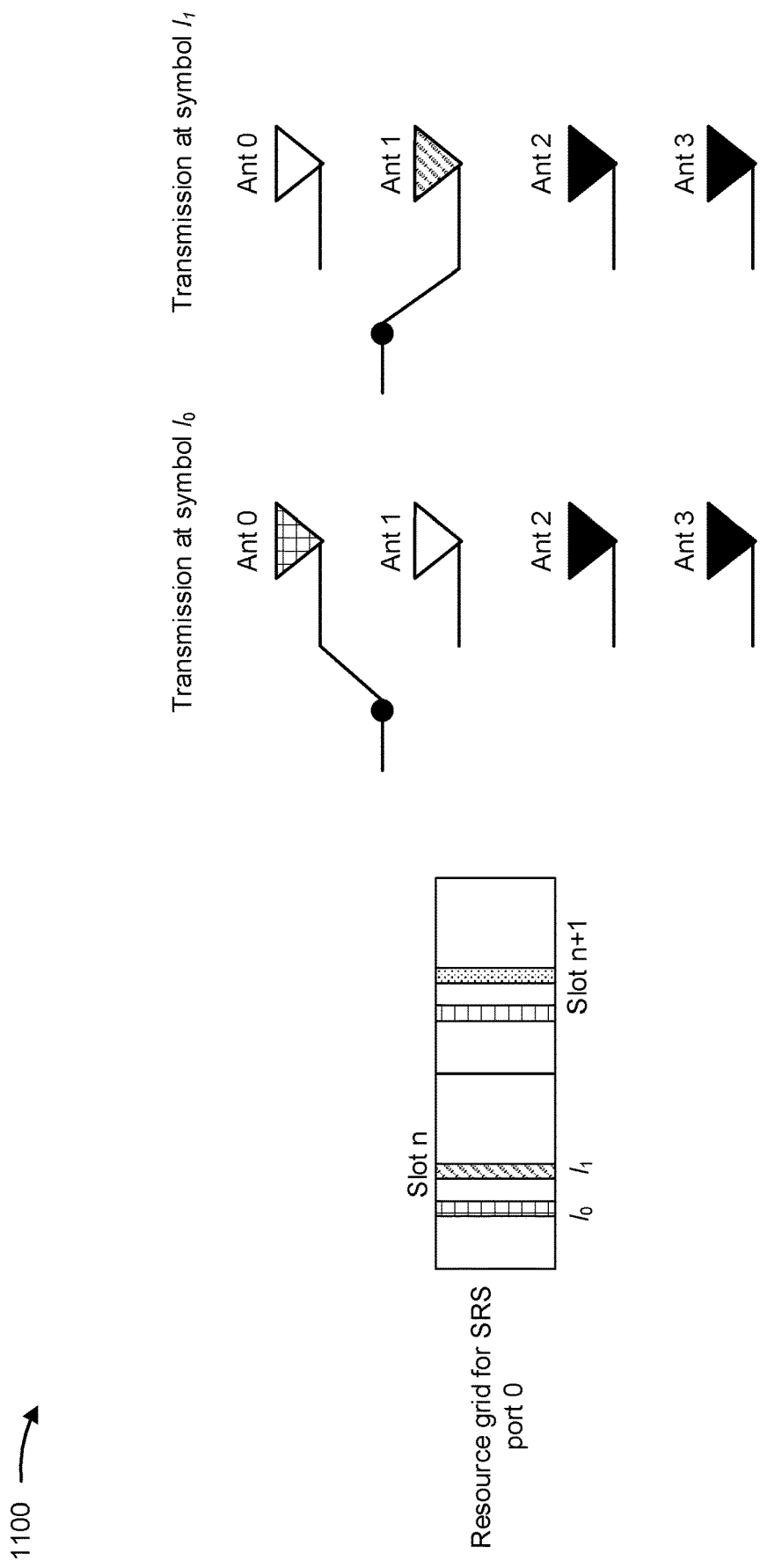
FIG. 11 is a diagram illustrating an example of antenna blanking for an XT4R SRS configuration, in accordance with the present disclosure.

FIG. 11 is a diagram illustrating an example 1100 of antenna blanking for an 1T4R SRS configuration, in accordance with the present disclosure. As shown, example 1100 includes a resource grid or SRS resource set for a single SRS port associated with slots n and n+1, and associated with four SRS resources corresponding to four antennas: a first SRS resource shown with a square fill during symbol $l_0$ of slot n, a second SRS resource shown with a diagonal lined fill during symbol $l_1$ of slot n, a third SRS resource shown with a horizontal lined fill during a symbol of slot n+1, and a fourth SRS resource shown with a dotted fill during another symbol of slot n+1. As shown by the black fill of antennas 2 and 3, the UE may determine not to transmit an SRS resource on antennas 2 and 3 during slot n+1. For example, the UE may transmit the SRS during symbols $l_0$ and $l_1$ of slot n, and not on antennas 2 and 3 during slot n+1, on antenna 0 based at least in part on a determination that the SRS configuration exceeds an antenna capability of the UE. Thus, the UE may reduce impact of the SRS transmission on antennas 2 and 3 while continuing to transmit a subset of the SRS on antennas 0 and 1, which improves SRS accuracy and therefore throughput and network resource utilization without overwhelming an antenna capability of the UE.

As indicated above, FIGS. 7-11 are provided as one or more examples. Other examples may differ from what is described with regard to FIGS. 7-11.

The following provides an overview of some aspects of the present disclosure:

Aspect 1: A method of wireless communication performed by a user equipment (UE), comprising: receiving a first sounding reference signal (SRS) configuration, wherein the first SRS configuration indicates a number of antenna ports on which an SRS is to be transmitted; determining that the number of antenna ports indicated by the first SRS configuration exceeds an antenna capability of the UE; and transmitting one or more SRSs using a second SRS configuration based at least in part on determining that the first SRS configuration exceeds the antenna capability of the UE.

Aspect 2: The method of aspect 1, wherein the transmission of the one or more SRSs using the second SRS configuration uses fewer antenna ports than the number of antenna ports.

Aspect 3: The method of any of aspects 1-2, wherein the number of antenna ports is a number of receive antenna ports, and wherein the transmission of the one or more SRSs using the second SRS configuration uses a main transmit antenna of the UE.

Aspect 4: The method of aspect 3, wherein the transmission of the one or more SRSs using the second SRS configuration uses the main transmit antenna of the UE based at least in part on a determination that a communication associated with a first radio access technology is not impacted by the usage of the main transmit antenna, wherein the transmission of the one or more SRSs is associated with a second radio access technology.

Aspect 5: The method of any of aspects 1-2, wherein the transmission of the one or more SRSs using the second SRS configuration alternates between two or more antenna ports of the UE.

Aspect 6: The method of any of aspects 1-5, wherein the antenna capability is a first antenna capability that indicates a number of antenna ports that can be contemporaneously used by the UE, and wherein the first SRS configuration is based at least in part on a second antenna capability reported by the UE.

Aspect 7: The method of aspect 6, wherein the second antenna capability is for a non-standalone mode and the first antenna capability is for a standalone mode.

Aspect 8: The method of any of aspects 1-7, wherein the determination that the first SRS configuration exceeds the antenna capability of the UE is based at least in part on an antenna blanking configuration associated with multiple radio access technology operation of the UE.

Aspect 9: The method of any of aspects 1-8, wherein the determination that the first SRS configuration exceeds the antenna capability of the UE is based at least in part on a threshold associated with a quality of a communication of the UE.

Aspect 10: The method aspect 9, wherein the threshold associated with the quality of the communication of the UE includes a threshold block error rate or a threshold throughput.

Aspect 11: An apparatus for wireless communication at a device, comprising a processor; memory coupled with the processor; and instructions stored in the memory and executable by the processor to cause the apparatus to perform the method of one or more aspects of aspects 1-10.

Aspect 12: A device for wireless communication, comprising a memory and one or more processors coupled to the memory, the memory and the one or more processors configured to perform the method of one or more aspects of aspects 1-10.

Aspect 13: An apparatus for wireless communication, comprising at least one means for performing the method of one or more aspects of aspects 1-10.

Aspect 14: A non-transitory computer-readable medium storing code for wireless communication, the code comprising instructions executable by a processor to perform the method of one or more aspects of aspects 1-10.

Aspect 15: A non-transitory computer-readable medium storing a set of instructions for wireless communication, the set of instructions comprising one or more instructions that, when executed by one or more processors of a device, cause the device to perform the method of one or more aspects of aspects 1-10.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving a first sounding reference signal (SRS) configuration, wherein the first SRS configuration indicates a number of antenna ports on which an SRS is to be transmitted;

determining that the number of antenna ports indicated by the first SRS configuration exceeds an antenna capability of the UE; and transmitting one or more SRSs using a second SRS configuration based at least in part on determining that the first SRS configuration exceeds the antenna capability of the UE.

2. The method of claim 1, wherein the transmission of the one or more SRSs using the second SRS configuration uses fewer antenna ports than the number of antenna ports.

3. The method of claim 1, wherein the number of antenna ports is a number of receive antenna ports, and wherein the transmission of the one or more SRSs using the second SRS configuration uses a main transmit antenna of the UE.

4. The method of claim 3, wherein the transmission of the one or more SRSs using the second SRS configuration uses the main transmit antenna of the UE based at least in part on a determination that a communication associated with a first radio access technology is not impacted by the usage of the main transmit antenna, wherein the transmission of the one or more SRSs is associated with a second radio access technology.

5. The method of claim 1, wherein the transmission of the one or more SRSs using the second SRS configuration alternates between two or more antenna ports of the UE.

6. The method of claim 1, wherein the antenna capability is a first antenna capability that indicates a number of antenna ports that can be contemporaneously used by the UE, and wherein the first SRS configuration is based at least in part on a second antenna capability reported by the UE.

7. The method of claim 6, wherein the second antenna capability is for a non-standalone mode and the first antenna capability is for a standalone mode.

8. The method of claim 1, wherein the determination that the first SRS configuration exceeds the antenna capability of the UE is based at least in part on an antenna blanking configuration associated with multiple radio access technology operation of the UE.

9. The method of claim 1, wherein the determination that the first SRS configuration exceeds the antenna capability of the UE is based at least in part on a threshold associated with a quality of a communication of the UE.

10. The method of claim 9, wherein the threshold associated with the quality of the communication of the UE includes a threshold block error rate or a threshold throughput.

11. A user equipment (UE) for wireless communication, comprising:

a memory; and one or more processors operatively coupled to the memory, the memory and the one or more processors configured to:

receive a first sounding reference signal (SRS) configuration, wherein the first SRS configuration indicates a number of antenna ports on which an SRS is to be transmitted;

determine that the number of antenna ports indicated by the first SRS configuration exceeds an antenna capability of the UE; and transmit one or more SRSs using a second SRS configuration based at least in part on determining that the first SRS configuration exceeds the antenna capability of the UE.

12. The UE of claim 11, wherein the transmission of the one or more SRSs using the second SRS configuration uses fewer antenna ports than the number of antenna ports.

13. The UE of claim 11, wherein the number of antenna ports is a number of receive antenna ports, and wherein the transmission of the one or more SRSs using the second SRS configuration uses a main transmit antenna of the UE.

14. The UE of claim 13, wherein the transmission of the one or more SRSs using the second SRS configuration uses the main transmit antenna of the UE based at least in part on a determination that a communication associated with a first radio access technology is not impacted by the usage of the main transmit antenna, wherein the transmission of the one or more SRSs is associated with a second radio access technology.

15. The UE of claim 11, wherein the transmission of the one or more SRSs using the second SRS configuration alternates between two or more antenna ports of the UE.

16. The UE of claim 11, wherein the antenna capability is a first antenna capability that indicates a number of antenna ports that can be contemporaneously used by the UE, and wherein the first SRS configuration is based at least in part on a second antenna capability reported by the UE.

17. The UE of claim 16, wherein the second antenna capability is for a non-standalone mode and the first antenna capability is for a standalone mode.

18. The UE of claim 11, wherein the determination that the first SRS configuration exceeds the antenna capability of the UE is based at least in part on an antenna blanking configuration associated with multiple radio access technology operation of the UE.

19. The UE of claim 11, wherein the determination that the first SRS configuration exceeds the antenna capability of the UE is based at least in part on a threshold associated with a quality of a communication of the UE.

20. The UE of claim 19, wherein the threshold associated with the quality of the communication of the UE includes a threshold block error rate or a threshold throughput.

21. A non-transitory computer-readable medium storing a set of instructions for wireless communication, the set of instructions comprising:
one or more instructions that, when executed by one or more processors of a user equipment (UE), cause the UE to:
receive a first sounding reference signal (SRS) configuration, wherein the first SRS configuration indicates a number of antenna ports on which an SRS is to be transmitted;
determine that the number of antenna ports indicated by the first SRS configuration exceeds an antenna capability of the UE; and
transmit one or more SRSs using a second SRS configuration based at least in part on determining that the first SRS configuration exceeds the antenna capability of the UE.

22. The non-transitory computer-readable medium of claim 21, wherein the transmission of the one or more SRSs using the second SRS configuration uses fewer antenna ports than the number of antenna ports.

23. The non-transitory computer-readable medium of claim 21, wherein the number of antenna ports is a number of receive antenna ports, and wherein the transmission of the one or more SRSs using the second SRS configuration uses a main transmit antenna of the UE.

24. The non-transitory computer-readable medium of claim 23, wherein the transmission of the one or more SRSs using the second SRS configuration uses the main transmit antenna of the UE based at least in part on a determination that a communication associated with a first radio access technology is not impacted by the usage of the main transmit antenna, wherein the transmission of the one or more SRSs is associated with a second radio access technology.

25. The non-transitory computer-readable medium of claim 21, wherein the transmission of the one or more SRSs using the second SRS configuration alternates between two or more antenna ports of the UE.

26. The non-transitory computer-readable medium of claim 21, wherein the antenna capability is a first antenna capability that indicates a number of antenna ports that can be contemporaneously used by the UE, and wherein the first SRS configuration is based at least in part on a second antenna capability reported by the UE.

27. An apparatus for wireless communication, comprising:
means for receiving a first sounding reference signal (SRS) configuration, wherein the first SRS configuration indicates a number of antenna ports on which an SRS is to be transmitted;
means for determining that the number of antenna ports indicated by the first SRS configuration exceeds an antenna capability of the apparatus; and
means for transmitting one or more SRSs using a second SRS configuration based at least in part on determining that the first SRS configuration exceeds the antenna capability of the apparatus.

28. The apparatus of claim 27, wherein the transmission of the one or more SRSs using the second SRS configuration uses fewer antenna ports than the number of antenna ports.

29. The apparatus of claim 27, wherein the number of antenna ports is a number of receive antenna ports, and wherein the transmission of the one or more SRSs using the second SRS configuration uses a main transmit antenna of the apparatus.

30. The apparatus of claim 29, wherein the transmission of the one or more SRSs using the second SRS configuration uses the main transmit antenna of the apparatus based at least in part on a determination that a communication associated with a first radio access technology is not impacted by the usage of the main transmit antenna, wherein the transmission of the one or more SRSs is associated with a second radio access technology.

* * * * *